Figure 1:
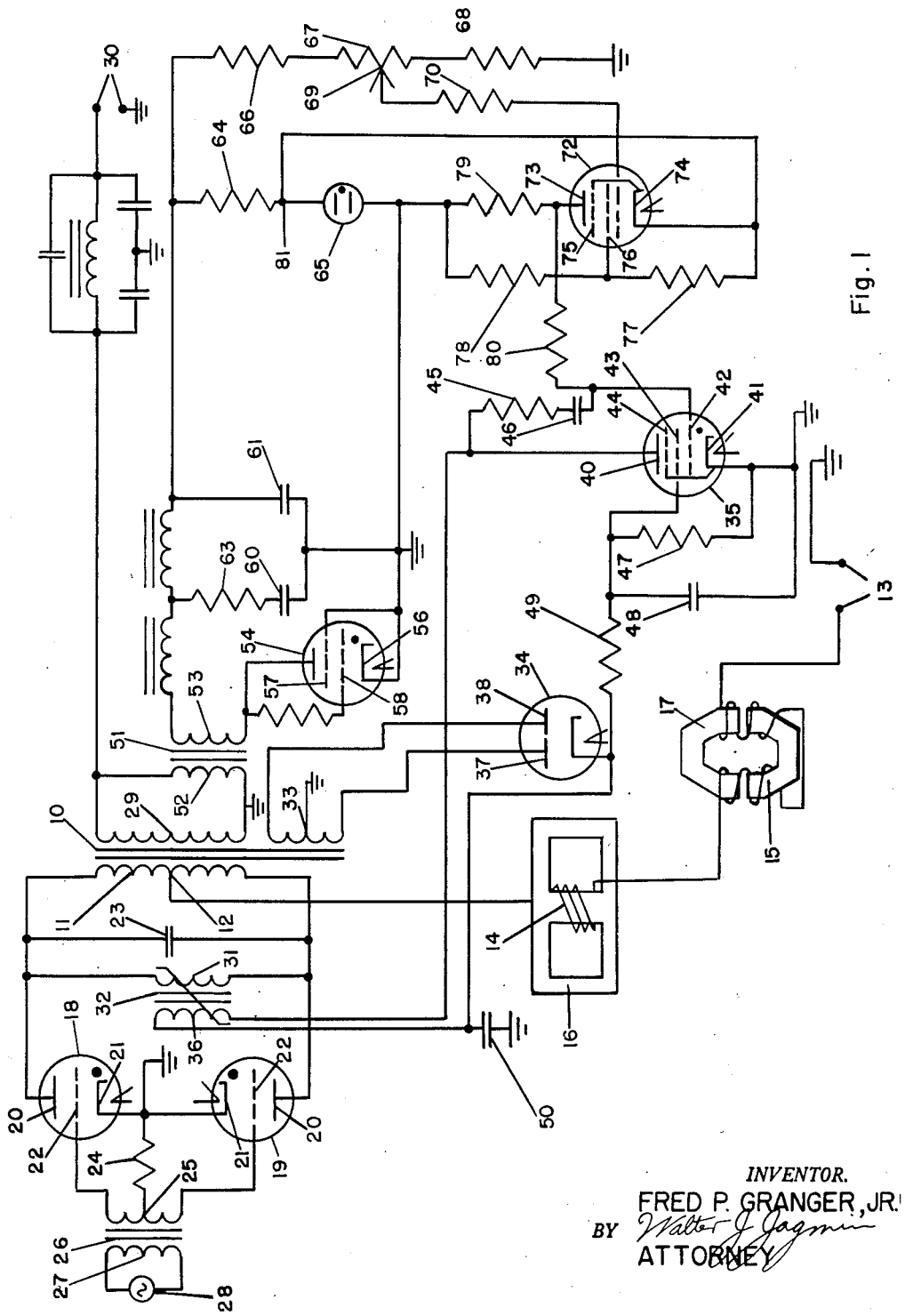

April 14, 1953　　　F. P. GRANGER, JR　　　2,635,222
ELECTRICAL CONVERTING APPARATUS
Filed June 18, 1951　　　　　　　　　　　2 SHEETS—SHEET 1

INVENTOR.
FRED P. GRANGER, JR.
BY Walter J. Jagmin
ATTORNEY

April 14, 1953     F. P. GRANGER, JR     2,635,222

ELECTRICAL CONVERTING APPARATUS

Filed June 18, 1951     2 SHEETS—SHEET 2

*INVENTOR.*
FRED P. GRANGER, JR.
BY
ATTORNEY

Patented Apr. 14, 1953

2,635,222

UNITED STATES PATENT OFFICE 2,635,222

ELECTRICAL CONVERTING APPARATUS

Fred P. Granger, Jr., Garland, Tex.

Application June 18, 1951, Serial No. 232,099

4 Claims. (Cl. 321—25)

This invention relates to electric valve converting apparatuses and more particularly to such apparatuses adapted to transmit energy from a direct current supply circuit to an alternating current load circuit.

The electric valve converting apparatus for transmitting energy from a direct current supply circuit to an alternating current load circuit, known in the art as a parallel inverter, comprises a pair of grid controlled gaseous discharge electric valves having anodes connected to opposite ends of an inductive winding, a commutating capacitance connected across the inductive winding, and an inductance connected between the direct current circuit and the electrical midpoint of the inductive winding. It has been found that the value of the inductance is very critical and that for optimum performance of the inverter it must be varied in accordance with the current drawn from the direct current supply circuit over a certain critical operating range of the inverter. The inductance affects the starting characteristics of the inverter since it controls transient currents and transient voltages. It also affects the running performance of the transformer when the inverter is subjected to normal loads since the inductance controls peak inverse voltage and the firing points of the electric valves in the cycle of the voltages applied to the anodes of the electric valves. The inductance must also be of such value as to preclude undesirable oscillations in the inverter since it comprises a part of the tuned circuit of the inverter.

It has been discovered that to ensure prompt and reliable starting and optimum operation of the inverter under normal load conditions, the inductance should be of relatively high value at the start of operation of the inverter, should decrease in accordance with the current transmitted by the electric valves until the inverter approaches its normal load range, and thereafter should remain at a substantially constant predetermined value as long as the inverter functions in its normal operating range.

Accordingly, it is an object of my invention to provide a new and improved electric valve converting apparatus.

It is another object of my invention to provide a new and improved electric valve converting apparatus for transmitting energy from a direct current supply circuit to an alternating current load circuit having a variable inductance which varies in accordance with the current transmitted by said apparatus to secure optimum operation of the apparatus.

It is still another object of my invention to provide a new and improved electric valve converting apparatus for transmitting energy from a direct current supply circuit to an alternating current load circuit which varies from a maximum value at the initiation of operation of the apparatus to a substantially constant minimum value in the normal load range of the inverter.

Briefly stated, my new and improved electric valve converting apparatus for transmitting energy from a direct current supply circuit to an alternating current load circuit comprises a pair of grid controlled gaseous discharge electric valves having anodes connected to opposite ends of an inductive winding, a commutating capacitance connected across the inductive winding, and a saturating reactor and an air gap reactor connected in series between the direct current circuit and the electrical midpoint of the inductive winding. Since the inductance of the saturating reactor is initially high and decreases to approach zero as the current drawn from the direct current supply circuit increases and since the inductance of the air gap reactor remains substantially constant regardless of the variations in current drawn from the direct current supply circuit, the combined inductance of the two reactors is relatively very high at the initiation of operation of the apparatus, decreases as the current drawn from the direct current supply circuit increases and the apparatus approaches its normal operating range, and thereafter remains at a substantially constant predetermined value as long as the apparatus functions in its normal operating range.

For a better understanding of my invention, reference may be had to the following description taken in connection with the accompanying drawing and its scope will be pointed out in the appended claims.

Figure 3:
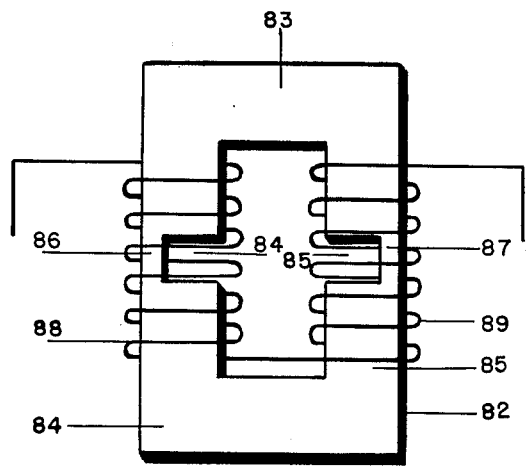
Figure 2:
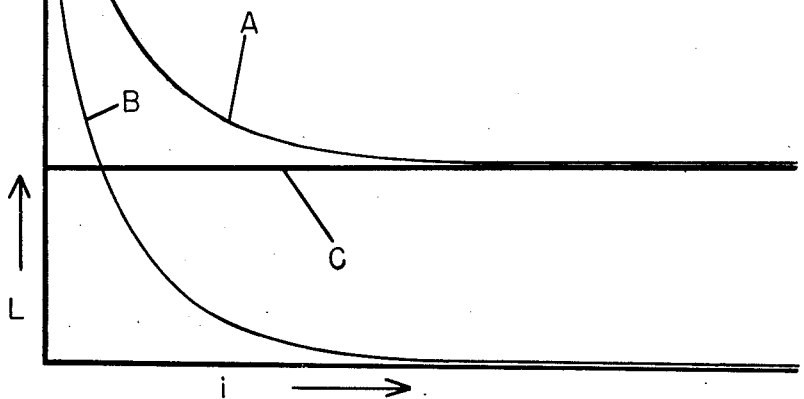

In the drawings, Figure 1 illustrates diagrammatically a parallel inverter embodying my invention; Figure 2 represents certain operating characteristics of the apparatus shown in Figure 1; and, Figure 3 is a modified embodiment of a part of the apparatus shown in Figure 1.

Referring now to the drawing, the illustrated embodiment of the invention comprises a transformer 10 provided with a primary winding 11 having its electrical midpoint 12 connected to one side of the direct current supply circuit 13 through the windings 14 and 15 of saturating reactor 16 and air gap reactor 17, respectively. The end terminals of winding 11 are connected to the other side of the direct current supply circuit 13 through electric valves 18 and 19 and ground. Electric valves 18 and 19 are each provided with an anode 20, a cathode 21 and a control grid 22 and may be of the gaseous discharge type. A commutating capacitor 23 is connected between anodes 20 of electric valves 18 and 19. In order periodically to render the electric valves 18 and 19 alternately conductive and nonconductive, their control grids 22 are connected to their common cathode circuit through current limiting resistance 24 and opposite halves of the secondary winding 25 of a transformer 26. The primary winding 27 of transformer 26 is connected to any suitable source 28 of alternating current of the desired frequency.

The general principle of operation of the above described inverter will be well understood by those skilled in the art. In brief, if one of the electric valves, for example, the valve 18 is initially rendered conductive, current will flow through the upper portion of winding 11 and valve 18 inducing a half cycle of alternating current in the secondary winding 29 of transformer 19. During this interval the capacitor 23 becomes charged to substantially twice the potential of supply circuit 13 and, when the grid potential supplied by secondary winding 25 reverses polarity to render the valve 19 conductive, the potential of capacitor 23 is effective to commutate the current from the valve 18 to the valve 19. Current now flows through the lower portion of winding 11 inducing a half cycle of alternating current of opposite polarity in the secondary winding 29 of transformer 10. In this manner the current is succesively commutated between the valves 18 and 19 and an alternating current is induced in the secondary winding 29 of transformer 10.

In order to control the voltage of the alternating current supply circuit 30, the reactive winding 31 of a saturable reactor 32 is connected across primary winding 11. An auxiliary secondary winding 33 of transformer 10 is connected through an electric valve 34 and an electric discharge device 35 to the saturating winding 36 of saturable reactor 32. Electric valve 34 is a full wave rectifier and comprises anodes 37 and 38 and a cathode 39. Electric discharge device 35, preferably of the high vacuum type, comprises an anode 40, a cathode 41, a control grid 42, a screen grid 43, and a suppressor grid 44 which is connected to cathode 41. Anode 40 is connected to control grid 42 through a resistance 45 and a capacitance 46 to prevent high frequency oscillation of electric discharge means 35. Screen grid 43 is connected to ground through resistance 47, capacitor 48, and resistance 49 and capacitor 50.

It can be seen now that saturable reactor 32 and commutating capacitor 33 comprise a parallel resonant circuit. If the impedance of saturable reactor 32 is increased, the voltage across primary winding 11 is increased. As a result, the voltage across winding 29 is also increased. Conversely, if the impedance of saturable reactor 32 is decreased, the voltage across secondary winding 29 is decreased. The impedance of saturable reactor 32 can be controlled by varying the conductivity of electric discharge device 35. If the conductivity of electric discharge device 35 increases with an increase of the voltage of alternating current load circuit 30, the current flowing in saturating winding 36 is increased and the impedance of saturable reactor 32 is decreased. This causes a decrease in the voltage of alternating current circuit 30. On the other hand, if the conductivity of electric discharge means 47 is decreased, the impedance of saturable reactor 32 is increased and the voltage of alternating current circuit 30 is increased.

The control means for varying the conductivity of electric discharge device 35 comprises a voltage sensing transformer 51 having a primary winding 52 connected across secondary winding 29 and a secondary winding 53. An electric valve 54 which acts as a rectifier is connected to secondary winding 53 and comprises an anode 55, a cathode 56, a suppressor grid 57 which is connected to cathode 56, and a screen grid 58 which is connected to anode 55 through a resistance 59. Connected across the secondary winding 53 and valve 54 is a filter which may comprise capacitors 60 and 61, a reactor 62 and a resistance 63. Also, connected across secondary winding 53 and valve 54 is a voltage divider bridge comprising in series relation a resistance 64 and a glow discharge means 65 which acts as a voltage regulator. Another voltage divider bridge comprising serially connected resistances 66, 67, and 68 is also connected across winding 53 and valve 54.

A voltage control or voltage adjusting contact 69 connects resistance 67, through a resistance 70, to the control grid 71 of an electric discharge device 72 to impress on control grid 71 a potential which varies in accordance with the voltage of secondary winding 53 and therefore with the voltage of alternating current circuit 30. Electric discharge device 72 comprises, in addition to control grid 71, an anode 73, a cathode 74, a suppressor grid 75 connected to cathode 74, and a screen grid 76 connected to cathode 74 through a resistance 77 and to ground through a resistance 78. Electric discharge device 72 is connected in series with a resistance 79 across glow discharge means 65. Anode 73 of electric discharge device 72 is connected through a resistance 80 to control grid 42 of electric discharge device 35 to impress on the control grid 42 a potential which varies in accordance with the voltage of alternating current circuit 30.

The common junction 81 of glow discharge means 65 and resistance 64 is connected to cathode 74 thereby maintaining its potential substantially constant with respect to ground. The potential of grid 71, however, varies in accordance with the voltage of the voltage divider which comprises resistances 66, 67 and 68. Thus, when the voltages of secondary windings 29 and 53 increase, a more negative potential is impressed on control grid 71 of electric discharge device 72. Electric discharge device 72 amplifies the change in potential of grid 71 and impresses a more positive potential on grid 42 of electric discharge device 35. Electric discharge means 35, therefore, becomes more conductive and transmits more current through saturating winding 36, the impedance of saturable reactor 32 is decreased, and the voltage of alternating current circuit 30 is decreased. Conversely, when the voltage of secondary windings 29 and 53 is decreased, the conductivity of electric discharge device 35 is decreased and the voltage of alternating current circuit 30 is increased. The voltage of alternating current circuit 30 can thus be maintained substantially constant.

The exact voltage to be maintained across alternating current circuit 30 can be set by adjusting the position of adjustable contact 69 on resistance 67 determines the bias on control grid 71 and, hence, the current flowing in saturating winding 36 under normal conditions of output voltage.

While I prefer to use saturable reactor 32 connected across primary winding of transformer 11, it may be connected across the secondary winding 29 if desired as may be the commutating capacitor. Indeed, the inverter will operate with both the commutating capacitor 23 and the saturable reactor 32 connected across secondary winding 29. The position of the saturable reactor 32 illustrated in the drawing leads to greater efficiency of the translating apparatus.

It has been discovered that for most efficient operation of an electric valve converting apparatus for transmitting energy from a direct current supply circuit to an alternating current circuit of the type described above, the inductance, i. e., the combined inductance of reactors 16 and 17, connected between the direct current supply circuit 13 and the electrical midpoint 12 of primary winding 11 must vary in a certain predetermined manner in accordance with the current drawn from direct current supply circuit 13. The manner in which it must vary depends on various factors such as the reactive values of the various components of the voltage control circuit as well as the reactive values of the electric valve converting apparatus, i. e., the inverter itself. For the reason, the manner in which the inductance must vary for optimum results will be different for such apparatuses where different control circuits are employed therewith.

As indicated by curve A of Figure 2, the inductance should be high at the initiation of operation of the apparatus when the current drawn from the direct current supply circuit 13 is low, should decrease as the current increases until a predetermined low value of inductance is reached, and thereafter should remain substantially constant even though the current drawn continues to increase. The predetermined low value is such as to maintain the apparatus in operation and prevent undesirable oscillations in the alternating current of circuit 30.

Air gap reactors, such as reactor 15, can be designed to have a substantially constant predetermined inductance as is indicated by the line B of Figure 2. Self saturating reactors, such as reactor 16, can be designed to have an inductance which is high when the current flowing through the reactor is very small and which decreases to approach zero as the current increases. By employing a suitable self saturating reactor 16 and a suitable air gap reactor 15, their combined inductance can be made to vary in the manner indicated by curve A.

Figure 3 illustrates a reactor 82 having an inductance which varies approximately in the manner indicated by curve A. Reactor 82 comprises a core 83 having legs 84 and 85 which have reduced portions 86 and 87, respectively. The slots or grooves 88 and 89 formed in legs 84 and 85, respectively, provide air gaps in the path of the magnetic flux produced by current in the windings 88 and 89 while the reduced portions 86 and 87 are saturable portions of the path. As a result the inductance of reactor 82 will be high when little current flows through windings 88 and 89 and will decrease as the current increases due to the progressive saturation of the portions 86 and 87. When portions 86 and 87 are completely saturated, the rate of decrease of the inductance of reactor 84 with increase of current in windings 88 and 89 will lessen. The air gaps 84 and 85, however, will prevent the inductance from approaching zero as occurs in conventional self-saturating reactors.

While the reactor 82 of Figure 3 may be employed advantageously in some applications, the use of two reactors 15 and 16 is preferred since a more perfect control of the manner in which the inductance is varied can be achieved.

Either the commutating capacitor 23 or the saturating reactor 32 may be connected across the secondary winding 29. Indeed, the apparatus will operate even if both the commutating capacitor 23 and the saturable reactor 32 are connected across the secondary winding 29. This illustrated arrangement is preferred since it leads to maximum efficiency of the apparatus.

While I have illustrated and described preferred embodiments of my invention, it will be obvious that various changes and modifications may be made without departing from my invention and I, therefore, aim in the appended claims to cover all such changes and modifications as fall within the true spirit and scope of my invention.

What I claim as new and desire to secure by Letters Patent of the U. S. is:

1. In combination: a direct current supply circuit; an alternating current load circuit; electric translating apparatus connected between said circuits comprising an inductive winding having terminals connected to one side of said direct current supply circuit through a pair of electric valves, said inductive winding having an electrical midpoint, and a capacitor connected across said inductive winding; a variable inductance which varies in accordance with the current drawn from said direct current supply circuit and an inductance which remains substantially constant with changes in the current drawn from said direct current supply circuit connected in series between the other side of said direct current supply circuit and said electrical midpoint of said inductive winding.

2. In combination: a direct current supply circuit; an alternating current load circuit; an electric translating apparatus connected between said circuits comprising a transformer having a primary winding having end terminals connected to one side of said direct current supply circuit through a pair of electric valves, said primary winding having an electrical midpoint, and a capacitor connected across said primary winding, said transformer having a secondary winding connected to said alternating current load circuit; means operatively associated with said apparatus for maintaining the voltage of said alternating current load circuit substantially constant; and a variable inductance connected between the other side of said direct current supply circuit and said electrical midpoint, said inductance comprising a self-saturating reactor and an air gap reactor connected in series.

3. In combination: a direct current supply circuit; an alternating current load circuit; an electric translating apparatus connected between said circuits and comprising a transformer having a secondary winding and a primary winding said primary winding having end terminals connected to one side of said direct current circuit through a pair of electric valves, said primary winding having an electrical midpoint, and a capacitor connected across one of said windings; and a variable inductance connected between the other side of said direct current supply circuit and said electrical midpoint, said inductance comprising a self-saturating reactor and an air gap reactor connected in series.

4. In combination: a direct current supply circuit; an alternating current load circuit; an electric translating apparatus connected between said circuits and comprising a transformer having a secondary winding and a primary winding said primary winding having end terminals connected to one side of said direct current circuit through a pair of electric valves, said primary winding having an electrical midpoint, and a capacitor connected across one of said windings; and a variable inductance which varies in accordance with the current drawn from said direct current supply circuit and an inductance which remains substantially constant with changes in the current drawn from said direct current supply circuit connected in series between the other side of said direct current supply circuit and said electrical midpoint of said inductive winding.

FRED P. GRANGER, Jr.

References Cited in the file of this patent

UNITED STATES PATENTS

| Number | Name | Date |
|---|---|---|
| 2,036,844 | Willis | Apr. 7, 1936 |